No. 733,212. PATENTED JULY 7, 1903.
A. A. JONES.
ROBE HOLDER.
APPLICATION FILED MAR. 27, 1903.
NO MODEL.
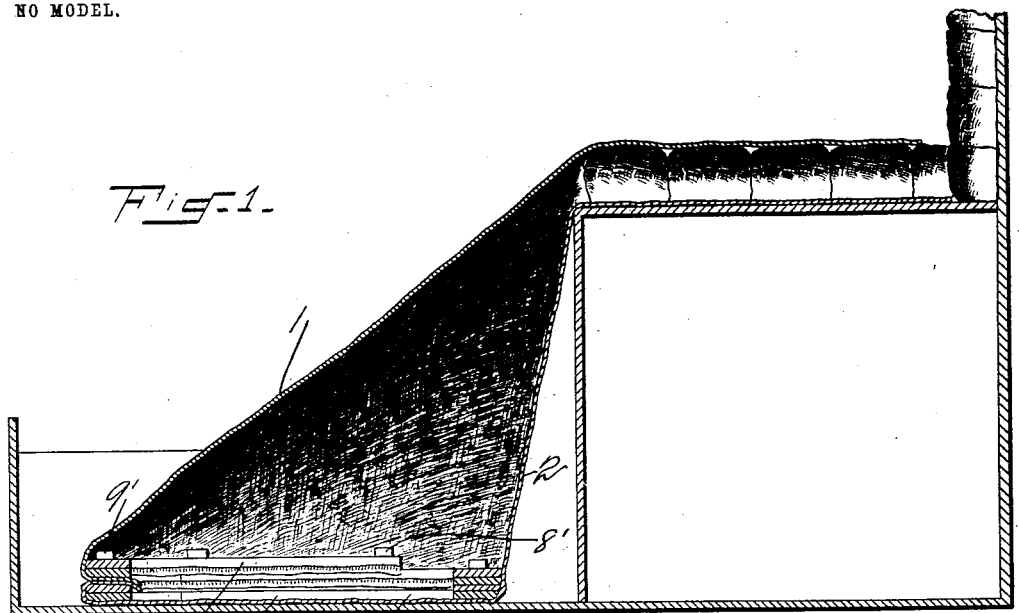
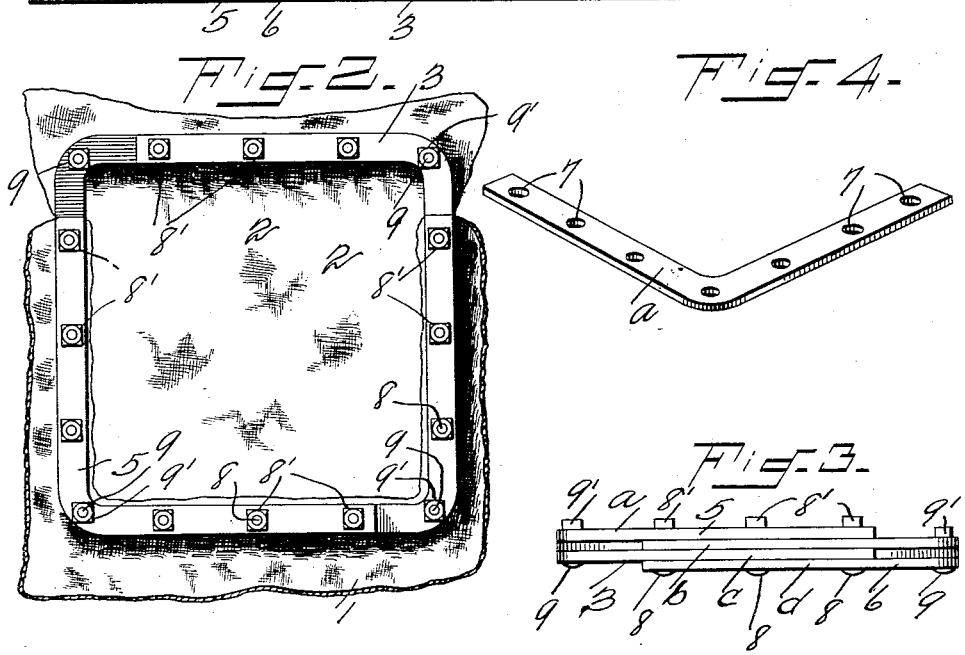
Witnesses
George Hilton
Inventor
A. A. Jones,
By
Attorney No. 733,212. Patented July 7, 1903.

UNITED STATES PATENT OFFICE.

ARTHUR A. JONES, OF CASS CITY, MICHIGAN.

ROBE-HOLDER.

SPECIFICATION forming part of Letters Patent No. 733,212, dated July 7, 1903.

Application filed March 27, 1903. Serial No. 149,880. (No model.)

*To all whom it may concern:*

Be it known that I, ARTHUR A. JONES, a citizen of the United States, residing at Cass City, in the county of Tuscola and State of Michigan, have invented certain new and useful Improvements in Robe-Holders; and I do declare the following to be a full, clear, and exact description of the invention, such as will enable others skilled in the art to which it appertains to make and use the same.

This invention relates to improvements in lap-robes and holders for carriages, sleighs, and other vehicles.

The object of the invention is to provide a lap-robe and a holder for the same which when arranged in a vehicle will be firmly held against casual displacement from any cause and which will protect the occupant from cold or wet weather.

Another object is to provide a lap-robe holder that will be simple and quickly applied, adjustable to different widths or sizes of robes, strong and well adapted to the use for which it is designed.

With this and other objects in view the invention consists of certain novel features of construction, combination, and arrangement of parts, as will be more particularly described, and pointed out in the appended claims.

In the accompanying drawings, Figure 1 is a longitudinal sectional view of a buggy body and seat, showing the application of the robe and holder. Fig. 2 is a top plan view of the holder and lower robe, showing the upper robe in horizontal section. Fig. 3 is a side view of the holder with the robes removed, and Fig. 4 is a detail view of one of the corner-sections forming the holder.

In the drawings, 1 denotes the upper robe, and 2 the lower robe.

3 is the holder. The holder is constructed of two frames 5 and 6, preferably though not necessarily rectangular in shape, each frame being made up, preferably, of four sections *a*, *b*, *c*, and *d*, which in the present instance are shown to be right-angularly shaped corner-pieces arranged to form the two approximately square frames 5 and 6. The ends of the pieces *a*, *b*, *c*, and *d* are adapted to overlap, and through the same are formed a series of bolt-holes 7, which when the sections of both frames are assembled will be in vertical alinement. Through certain of the holes 7 are passed bolts 8, upon which are screwed nuts 8', which adjustably hold the sections together. In the rounded corners of the frames thus formed are also formed alined holes, through which are passed bolts 9, upon which are screwed nuts 9'. These bolts and nuts, in connection with the bolts and nuts 8 and 8', firmly clamp the frames together.

In use the forward end and lower side edges of the upper and lower robes are inserted between the frames 5 and 6 and the bolts 8 and 9 inserted and their nuts tightened up, thereby firmly clamping said edges between the frames. The robes and holder may now be placed in the vehicle, the free end of the lower robe being drawn up and placed upon the seat beneath the cushion, while the end of the upper robe is left free to be drawn up and tucked in around the occupant of the vehicle.

The frames 5 and 6 are constructed, preferably of narrow flat metal strips bent to th proper form; but it is obvious that the same may be constructed of wood or other material and in any form or shape, and it will be seen that when the robes are connected to the same they will be held down by the weight of the frame and will form practically a bag inclosing and protecting the lower extremities of the occupants of the vehicle. The frames in being constructed in four sections as shown permit the same to be adjusted in all directions to fit robes of various shapes and sizes.

From the foregoing description, taken in connection with the accompanying drawings, it is thought that the construction, operation, and advantages of my invention will be readily apparent without requiring a more extended explanation.

Various changes in the form, proportion, and the minor details of construction may be resorted to without departing from the principle or sacrificing any of the advantages of this invention.

Having thus particularly described my invention, what I claim, and desire to secure by Letters Patent, is—

1. A robe-holder for vehicles comprising two adjustable frames adapted to be clamped together to hold the lower ends and sides of a lap robe or robes between the same, substantially as described.

2. A robe-holder for vehicles, comprising two frames formed of two or more separate adjustable sections adapted to be bolted together to clamp the lower ends and sides of a lap robe or robes, between the same, substantially as described.

In testimony whereof I have hereunto set my hand in presence of two subscribing witnesses.

ARTHUR A. JONES.

Witnesses:
A. RANDALL,
E. B. LANDON.